United States Patent [19]

Tomasov

[11] Patent Number: 4,756,166
[45] Date of Patent: Jul. 12, 1988

[54] INTEGRAL RECEIVER/DEHYDRATOR AND EXPANSION VALVE FOR AIR CONDITIONING SYSTEMS

[75] Inventor: Glenn E. Tomasov, Lockport, N.Y.
[73] Assignee: General Motors Corporation, Detroit, Mich.
[21] Appl. No.: 120,362
[22] Filed: Nov. 13, 1987
[51] Int. Cl.[4] ............................................. F25B 39/04
[52] U.S. Cl. ........................................ 62/509; 62/474; 62/217
[58] Field of Search ................ 62/509, 474, 475, 217; 210/DIG. 6

[56] References Cited

U.S. PATENT DOCUMENTS

| | | | |
|---|---|---|---|
| 2,904,967 | 9/1959 | Henderson | 62/509 |
| 3,525,234 | 8/1970 | Widdowson | 62/509 |
| 3,759,062 | 9/1973 | Wrenn et al. | 62/474 |
| 3,778,984 | 12/1973 | Lawser | 62/474 |
| 3,953,984 | 5/1976 | Widdowson | 62/156 |
| 3,962,884 | 6/1976 | Widdowson | 62/217 |
| 3,965,693 | 6/1976 | Widdowson | 137/491 |
| 3,977,207 | 8/1976 | Scherer et al. | 62/217 |
| 4,354,362 | 10/1982 | Schumacher et al. | 62/474 |
| 4,621,505 | 11/1986 | Ares et al. | 62/509 |

Primary Examiner—Ronald C. Capossela
Attorney, Agent, or Firm—R. L. Phillips

[57] ABSTRACT

An integral receiver/dehydrator and expansion valve is disclosed in an automotive air conditioning system. A common housing comprises a receiver/dehydrator container surmounted by a connector body in a unitary construction. An electronically controlled expansion valve is disposed in an axial passage in the connector body and a valve chamber in the body connects the draw tube of the receiver/dehydrator to the valve orifice. An annular groove in the common wall between the connector body and the receiver/dehydrator container is connected by a radial passage through the body with the suction line of the receiver/dehydrator from the condenser. An annular chamber surrounding the valve outlet port is connected by a radial passage to the suction line of the evaporator. The radial passages may be disposed at any desired angle on the body to accommodate the connection of the receiver/dehydrator suction line and the evaporation suction line.

4 Claims, 3 Drawing Sheets

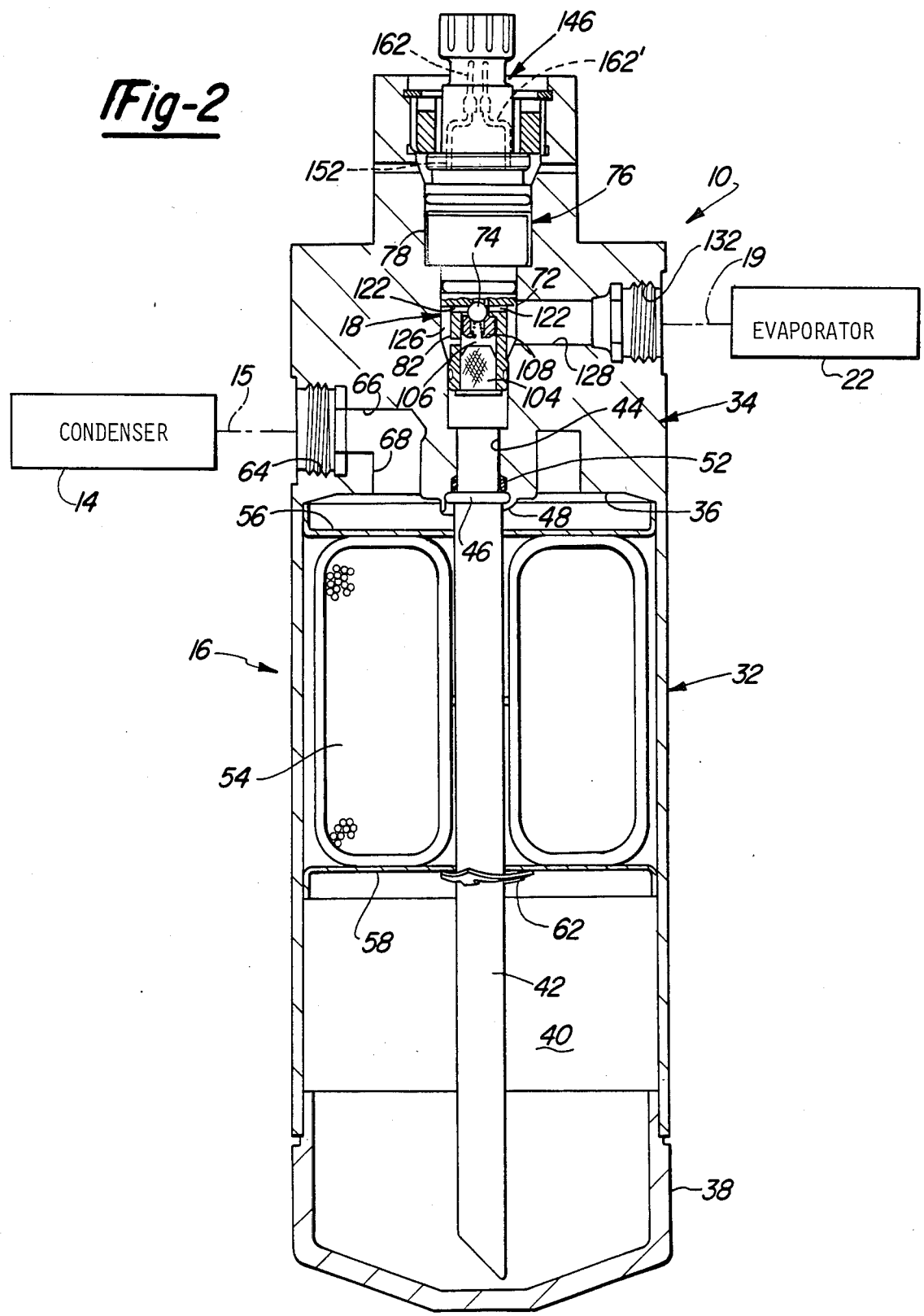

INTEGRAL RECEIVER/DEHYDRATOR AND EXPANSION VALVE FOR AIR CONDITIONING SYSTEMS

FIELD OF THE INVENTION

This invention relates to air conditioning systems; more particularly, it relates to an integral receiver/dehydrator and expansion valve for an air conditioning system.

BACKGROUND OF THE INVENTION

In present day automotive air conditioning systems, a refrigerant compressor is driven by the vehicle engine; the hot compressed refrigerant gas, typically Freon, from the compressor is supplied to a condenser for cooling and liquifying the refrigerant gas. The outlet of the condenser is connected to a receiver/dehydrator which holds a reserve quantity of the refrigerant and separates the gaseous refrigerant from the liquified refrigerant. A desiccant in the receiver/dehydrator removes moisture from the refrigerant. The liquid refrigerant is supplied from the outlet of the receiver/dehydrator to an expansion valve which controls the flow of refrigerant to an evaporator. In the evaporator, the liquid refrigerant passes through a heat exchanger and is vaporized by the absorption of heat from circulating air from the passenger compartment for cooling by the air conditioning system. The vaporous refrigerant from the outlet of the evaporator is returned to the suction side of the compressor.

In the prior art, the receiver/dehydrator and the expansion valve has been constructed as separate units as shown, for example, in the Widdowson U.S. Pat. No. 3,953,984 granted May 4, 1976. In the air conditioning system shown in that patent, the expansion valve is disposed within the same housing as a freeze sensor-actuator and a refrigerant bypass valve assembly for maintaining the evaporator temperature above a freezing level. The expansion valve is controlled by a bellows which is responsive to the pressure of the refrigerant at the inlet of the evaporator. A pressure decreases operates to unseat a ball valve and increase refrigerant flow through the expansion valve. The expansion valve is provided with a bleed passage in bypass relationship to the valve to provide a minimal flow of refrigerant to the evaporator.

An automotive air conditioning system in which the receiver/dehydrator and the expansion valve are contained in the same housing is disclosed in the Widdowson U.S. Pat. No. 3,965,693 granted June 29, 1976. In this system, the same housing also encloses a suction throttling valve which is utilized to control the suction line pressure and prevent frost formation on the evaporator. The container or housing for the receiver/dehydrator is provided with an inverted cup-shaped cover which is provided with an inlet fitting connected to the suction line extending from the outlet of the evaporator. The expansion valve is thermostatically operated and utilizes an actuator of the adsorbent type which is responsive to the temperature of the refrigerant at the suction side of the evaporator. The cover on the receiver/dehydrator is bolted in position and could be oriented in different positions to accommodate the connection of the suction line from the evaporator.

In automotive air conditioning systems, it is known in the prior art to utilize an expansion valve which is actuated in response to either pressure or temperature of the refrigerant in the evaporator suction line. The known actuators take one of several different forms. In the Widdowson U.S. Pat. No. 3,953,984 discussed above, a pressure responsive bellows is used as an actuator. In the Widdowson U.S. Pat. No. 3,965,693 discussed above, the expansion valve is operated by a temperature responsive actuator contained within the housing of the valve and the receiver/dehydrator. In the Widdowson U.S. Pat. No. 3,962,884 granted June 15, 1976, an expansion valve is illustrated which is actuated by a thermal bulb on the evaporator suction line which is coupled with the valve through a capillary. It is also known in automotive air conditioning systems to utilize a solenoid actuated expansion valve controlled by an electronic circuit in response to an electrical signal from either a temperature or pressure sensor in the evaporator suction line.

A general object of this invention is to provide an improved integrated receiver/dehydrator and expansion valve which overcomes certain disadvantages of the prior art.

SUMMARY OF THE INVENTION

In accordance with this invention, a receiver/dehydrator and an expansion valve, especially adapted for an automotive air conditioning system, are combined in a manner to provide improved efficiency and economy in manufacture as well as a lightweight, compact design. The combined structure is also adapted for universal mounting in installation in the sense that a connector body is provided which permits the connection of refrigerant conduits at any desired orientation relative to the connector body to provide an arrangement especially adapted for installation in a particular vehicle model. This is accomplished by an integrally contained receiver/dehydrator and expansion valve wherein the receiver/dehydrator container is surmounted by a connector body which supports an expansion valve which is in direct fluid communication with the receiver/dehydrator thus avoiding an external conduit therebetween. Further, an annular passage in the connector body provides fluid communication with the suction line of the receiver/dehydrator and an annular passage is provided in the connector body surrounding the expansion valve to provide fluid communication between the outlet of the valve and the suction line of the evaporator whereby the two suction lines may be connected to the connector body at any desired angular position.

Further, in accordance with this invention, an integral receiver/dehydrator and solenoid actuated expansion valve is provided in which the receiver/dehydrator container is surmounted by a connector body. The receiver chamber in the container is provided with a dehydrator in the upper portion and a draw tube extends between the connector body and the lower portion of the container in which the liquid refrigerant is collected. The connector body has a first annular passage in fluid communication with the receiver chamber and a valve bore extends into the connector body. The valve body is disposed in the bore and a valve chamber in the valve body is in fluid communication with the upper end of the draw tube. A second annular passage surrounds the valve body and a valve outlet port in the valve body is in fluid communication with the second annular passage. A valve orifice communicates with the valve chamber and the valve outlet port and a movable valve element is adapted to open and close the orifice. A laterally extending passage in the connector body is in fluid communication with the first annular passage for connection of a receiver/dehydrator suction line with the outlet of a condenser. A second laterally extending passage in the connector body is in fluid communication with the second annular passage for connection with the suction line of the evaporator. The laterally extending passages are disposed at any desired angular orientation on the connector body. Further, in accordance with the invention, the connector body and at least the upper end of the container are of unitary construction and are adapted for fabrication by extrusion or die casting or the like.

A complete understanding of this invention may be obtained from the detailed description that follows taken with the accompanying drawings.

DESCRIPTION OF THE DRAWINGS

FIG. 2 is a sectional view of the integral receiver/dehydrator and expansion valve of this invention;

BEST MODE FOR CARRYING OUT THE INVENTION

Figure 1:
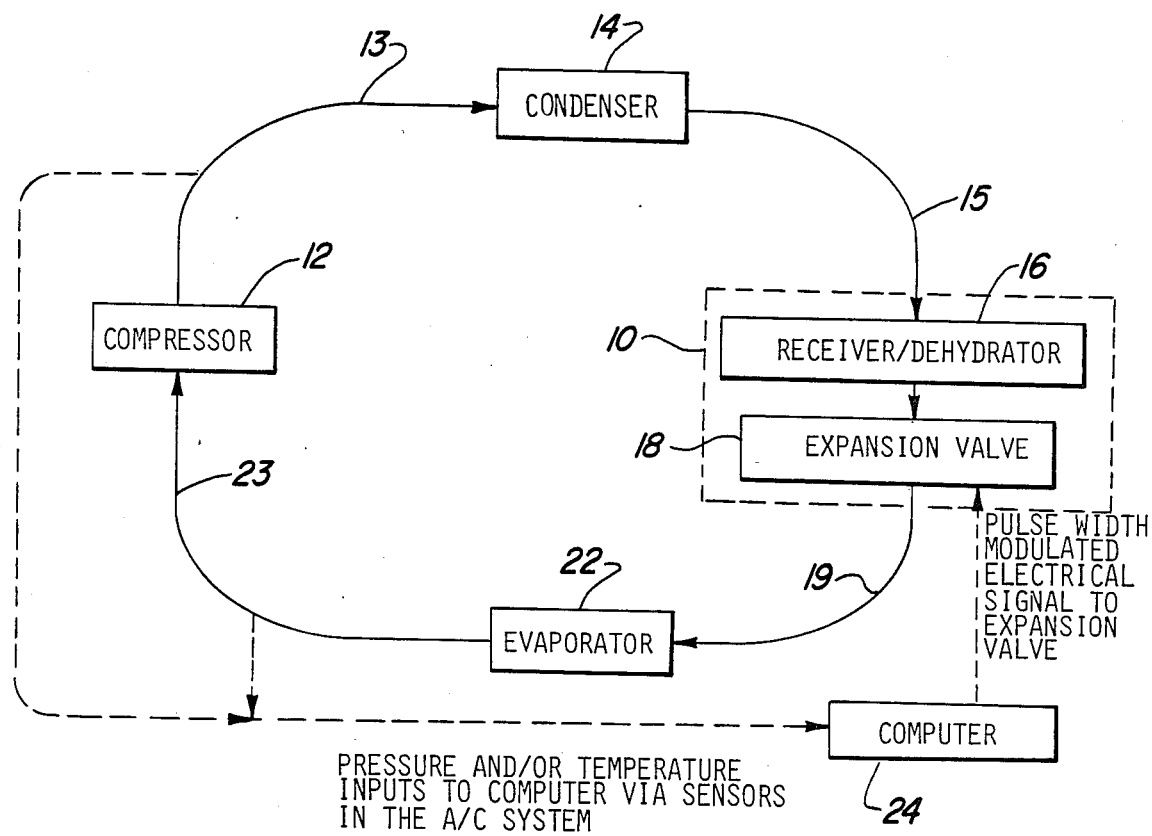
FIG. 1 shows a schematic diagram of an automotive air conditioning system with which the subject invention is useful.

Referring now to the drawings, there is shown an illustrative embodiment of the invention in an integral receiver/dehydrator and electronically controlled solenoid actuated expansion valve. It will be appreciated as the description proceeds that the invention may be embodied in different forms and may be utilized in different air conditioning systems.

A typical automotive air conditioning system in which the inventive integral receiver/dehydrator and expansion valve 10 may be used is illustrated schematically in FIG. 1. It comprises a refrigerant compressor 12 which is driven by the engine of the automobile. The outlet of the compressor is connected by a fluid conduit 13 to the inlet of a condenser 14. The condenser is normally located near the front of the automobile to be exposed to cooling air for liquifying the warm refrigerant received from the compressor. The outlet of the condenser 14 is connected by a fluid conduit 15 (receiver/dehydrator suction line) with the inlet of a receiver/dehydrator 16 which separates the vaporous refrigerant from liquified refrigerant. Additionally, a desiccant within the receiver/dehydrator removes moisture from the refrigerant. The liquid refrigerant is passed from the receiver/dehydrator to the inlet of an expansion valve 18. The expansion valve opens and closes under control of an on board computer 24 to control the flow of refrigerant through a fluid conduit 19 (evaporator suction line) to the inlet of an evaporator 22. The liquid refrigerant entering the evaporator 22 is vaporized by the absorption of heat from air which is circulated through a heat exchanger of the evaporator and through the passenger compartment of the automobile which is cooled by the circulating air. The vaporous refrigerant is withdrawn from the evaporator through a suction line conduit 23 which is connected with the inlet of the compressor 12.

Figure 3:
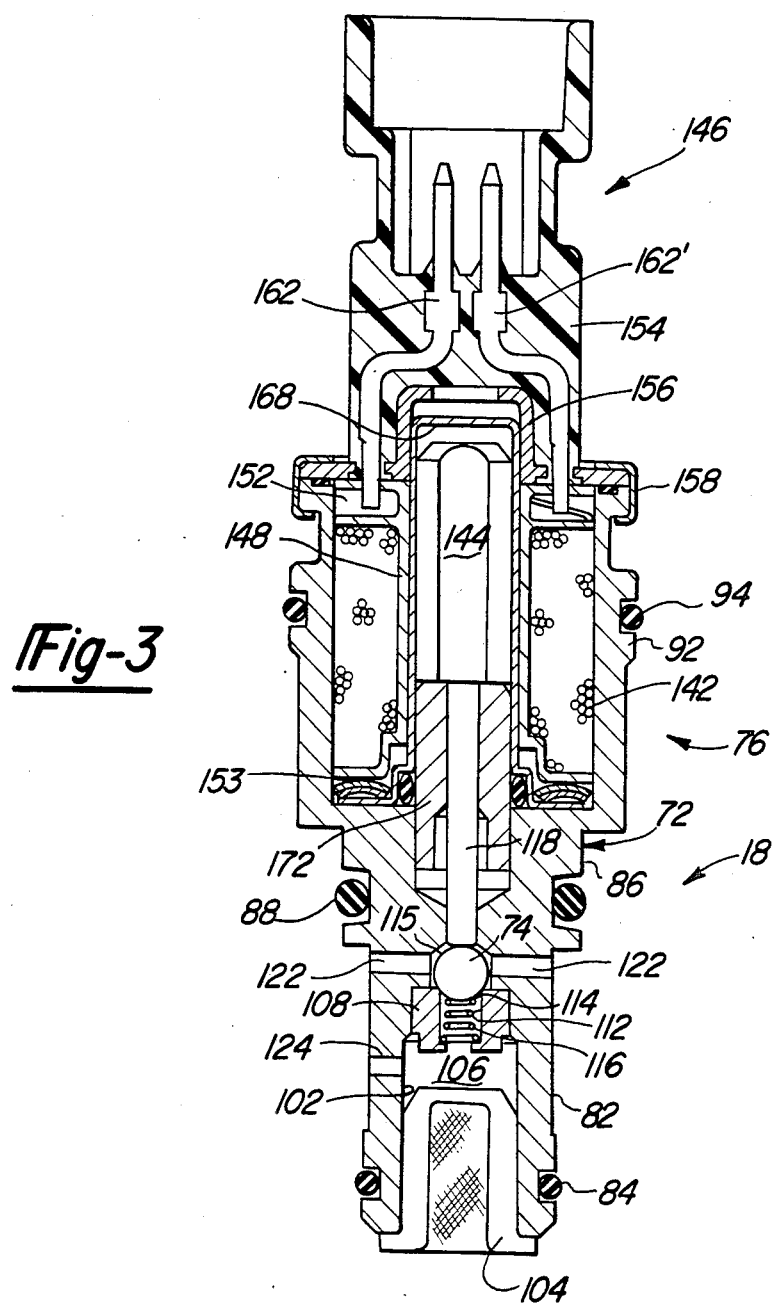
FIG. 3 is a sectional view showing the details of the electronically controlled solenoid actuated expansion valve.

The integral receiver/dehydrator and expansion valve 10 will be described in detail with reference to FIGS. 2 and 3. The integral receiver/dehydrator and expansion valve 10 comprises a housing which includes a receiver/dehydrator container 32 of cylindrical configuration and a connector body 34, also cylindrical, which surmounts the container 32 and has a common wall 36 therewith. The container 32 is provided with a separate cup-shaped bottom 38 joined thereto. The upper portion of the container 32 and the connector body 34 are formed as a unitary body. The receiver/dehydrator is disposed within the container 32 and comprises a vertically extending draw tube 42 which is supported by the connector body 34. For this purpose, a vertical passage 44 is provided centrally in the wall 36 and the upper end of the tube 42 extends into the passage. An annular rib 46 is provided on the tube 42 adjacent the upper end and is held in place by a crimp 48 in a peripheral lip surrounding the passage 44. The upper end of the tube 42 is sealed to the connector body 34 by an annular seal 52. A desiccant package 54 of annular configuration is disposed within the receiver chamber 40 at the upper end thereof. The desiccant package 54 is seated against an upper perforated spacer ring 56 and held in place by a lower perforated spacer ring 58 which is secured axially on the tube 42 by a push-on retaining ring 62.

For the purpose of conveying the compressed refrigerant from the condenser 14 to the receiver/dehydrator 16, the connector body 34 is provided with a radially extending threaded opening 64 which is adapted to receive a connector fitting (not shown) for suction line 15 from the condenser 14. A radially extending bore 66 extends from the opening 64 to an annular groove 68 in the wall 36 of the connector body 34. The refrigerant from the condenser 14 passes through the radial bore 66 and annular groove 68 and thence enters the receiver chamber 40 and passes through the perforated spacer ring 56, the desiccant package 54, and the perforated spacer ring 58 to the bottom of the chamber. The liquid component of the refrigerant which collects in the cup-shaped bottom 38 flows up the draw tube 42 to the expansion valve 18.

The expansion valve 18 will be described in detail with reference to FIGS. 2 and 3. The valve 18 comprises, in general, a valve body 72 of generally stepped cylindrical configuration, a movable valve element in the form of a ball 74 and a valve actuator 76. The valve body 72 is disposed in a valve bore 78 which extends axially into the connector body 34. The valve bore 78 is of smaller diameter at its lower end which receives the lower end section 82 of the valve body 72 in a sliding fit and is fluid sealed therewith by an O-ring 84. The valve bore 78 has an intermediate diameter which receives an intermediate section 86 of the valve body 72 in a sliding fit and is fluid sealed therewith by an O-ring 88. The upper end of the valve bore 78 has a larger diameter; it receives the upper end section 92 of the valve body 72 in a sliding fit and a fluid seal is provided therebetween by an O-ring 94.

The valve body 72 is provided at its lower end with a valve inlet port 102 which is covered by an inlet screen filter 104 which is in fluid communication with the vertical passage 44 in the connector body 34. A valve chamber 106 extends from the inlet port 102 to a tubular valve insert 108 which is provided with a valve orifice 112 surrounded by a valve seat 114 at its upper end. A movable ball 74 is adapted to move in a ball chamber 115 between a seated and unseated position with respect to the valve seat 114 and thus close or open the valve orifice. A bias spring 116 seated on a shoulder in the insert 108 engages the ball 74 and urges it toward the open position. An actuator pin 118 is adapted to act on the upper part of the ball 74 to close the valve orifice 112 as will be described later. Two or more valve outlet ports 122 extend radially from the ball chamber 115 to an annular passage 126 surrounding the peripheral surface of the valve body 72. A bleed port 124 extends radially from the valve chamber 106 to the annular passage 126. The bleed port 124 bypasses the valve orifice 112 and thus provides a continuous minimal flow of refrigerant to the annular chamber 126. The annular passage 126 surrounds the lower end section of the valve body 72 and is defined by it and the surrounding wall of the bore 78. The annular passage 126 opens into a radially extending bore 128 which terminates in a threaded opening 132 in the peripheral wall of the connector body 34. The threaded opening 132 is adapted to receive fitting (not shown) of the evaporator suction line 19.

It is to be noted that the lateral bores or passages 66 and 128 which are adapted for connection, respectively, with the condenser 14 and evaporator 22, for convenience of illustration are shown diametrically opposite each other on the connector body 34. However, either bore 66 or 128 may be located at any desired angular position on the connector body 34 in order to match the angular locations of the receiver/dehydrator suction line 15 and the evaporator suction line 19.

The valve actuator 76, in general, comprises a solenoid coil 142, an actuator plunger 144 and an electrical connector 146. The valve actuator 76 is disposed within a bore in the upper end section 92 of the valve body 72.

The solenoid coil 142 is wound on a coil bobbin 148 which is seated on a wave spring 153 in the bottom of the bore in the valve body upper end section 92. The bobbin is provided with an annular compartment 152 which receives the ends of the winding of the solenoid coil 142. The electrical connector 146 comprises a molded plastic body 154 which includes a metal hat-shaped member 156 molded into the body. A clinch ring 158 is clinched over a shoulder on the upper end of the valve body 72 and the rim of member 156 to retain the electrical connector 146 thereon. A pair of electrical terminals 162 and 162' extend through the body 154 and are electrically connected at their lower ends with the respective ends of the winding of the solenoid coil 142. The terminals 162 and 162' are adapted for connection through a suitable connector and electronic circuit to the computer 24.

The valve actuator 76, as mentioned above, includes the plunger 144. The plunger 144 is of magnetic material and is disposed within the solenoid coil 142, inside a cylindrical sleeve 166 of the bobbin 148. A plunger housing 168 in the form of an inverted cup is provided coaxially of the sleeve 166 and is constructed of magnetic material. The plunger housing 168 is retained in position by the flange portion thereof which is disposed under the wave spring 153. The magnetic circuit of the solenoid coil is completed by a pole piece 172 of cylindrical configuration which is disposed within the plunger housing 168 and secured to the valve body 72 by a press fit of its lower end into a recess in the valve body. The actuator pin 118 extends from the plunger 144 through a central opening in the pole piece 172 for engagement with the ball 74. When the solenoid coil 142 is energized, the plunger 144 is attracted toward the pole piece 172 and the pin 118 holds the ball 74 against the valve seat 114 to close the orifice 112 of the valve. In this condition, there is no flow of refrigerant through the outlet ports 122 but there is refrigerant flow through the bleed port 124 at the minimal level required by the system. When the coil 142 is deenergized, the valve spring 116 lifts the ball 74 off the seat 114 and opens the orifice 112. Thus, in this condition, there is refrigerant flow through the outlet ports 122 and the bleed port 124 to the radial passage 128 and thence through the suction line 19 to the evaporator 22.

Figure 4:
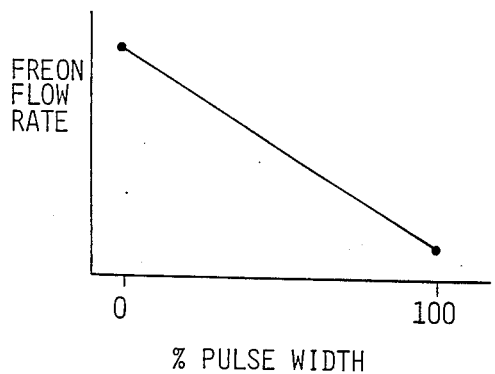
FIGS. 4 and 5 are graphical representations to aid in explanation of the operation of the expansion valve.
Figure 5:
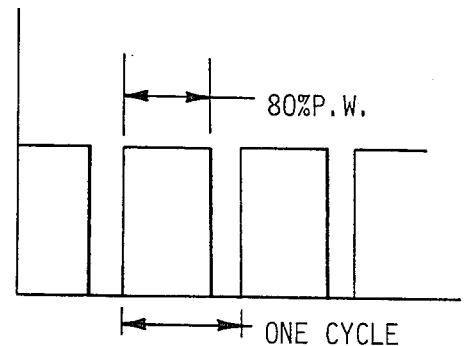

In operation, the refrigerant is circulated through the system by the compressor 12 and the mass flow thereof is regulated by the expansion valve 18, as will be described presently. The refrigerant from the condenser 14 which flows through the receiver/dehydrator suction line 15 enters the connector body 34 through the passage 66 and flows through the annular passage 68 therein into the receiver chamber 40 and through the dehydrator package 54. The liquid component of the refrigerant flows through the draw tube 42 and through the filter screen 104 to the valve chamber 106. The bleed passage 124 carries a minimal mass flow of the refrigerant, as required by the system, from the valve chamber 106 to the annular passage 126 and thence through the lateral passage 128 to the suction line 19 of the evaporator 22. This flow of the refrigerant is supplemented by operation of the valve 18. In the illustrative embodiment, the expansion valve 18 is operated as a pulse width modulated flow control valve. In this mode of operation, the on-board vehicle computer 24 receives inputs from a refrigerant temperature sensor or a refrigerant pressure sensor or both and computes the mass flow required in order to achieve optimum system performance. The computer generates control signal in the form of a fixed frequency rectangular pulse train, for example, a frequency of 8 Hertz, for control of the valve. This control signal may be applied through a driver circuit to the solenoid coil 142 to apply a 12 volt pulse train thereto. FIG. 5 shows the pulse train with the pulse width at its maximum value, i.e. at one hundred percent pulse width. The pulse width is modulated by the computer in accordance with the computation for optimum performance and may range from zero to one hundred percent pulse width. As shown in FIG. 4, the refrigerant flow rate is a function of the pulse width expressed as a percent of the maximum pulse width. When the valve is operated with one hundred percent pulse width, the refrigerant flow rate is at a minimum value and when it is at zero percent pulse width the flow of refrigerant is at a maximum value. It will be understood that the expansion valve 18 may also be operated as a two stage orifice valve under a control of the computer. In this mode, the refrigerant flow rate is a step function of time which varies between minimum and maximum flow rate in accordance with the on-off energization of the solenoid coil 142.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. For use in an air conditioning system of the type comprising a refrigerant compressor, a condenser connected with the outlet thereof and an evaporator connected with the inlet of said compressor, an integrally contained receiver/dehydrator and expansion valve comprising:

a connector body, a receiver/dehydrator container having an upper end surmounted by said connector body, said container having a closed lower end and defining a receiver chamber having a dehydrator disposed in the upper portion thereof and being adapted to collect liquid refrigerant in the lower portion thereof, said connector body having a first annular passage therein in fluid communication with said receiver chamber, a draw tube extending between said connector body and a point in the lower portion of said container, a valve bore extending into said connector body, a valve body disposed in said valve bore, a valve chamber in said valve body in fluid communication with the upper end of said draw tube, a second annular passage surrounding said valve body, a valve outlet port in said valve body in fluid communication with said second annular passage, a valve orifice in said valve body in fluid communication with said valve chamber and said valve outlet port, a movable valve element adapted to open and close said orifice, a first laterally extending passage in said connector body in fluid communication with said first annular passage and adapted to be connected with said condenser, and a second laterally extending passage in said connector body in fluid communication with said second annular passage and adapted to be connected with said evaporator, said laterally extending passages being disposed at any desired angular orientation on said connector body.

2. The invention as defined in claim 1 wherein said container is cylindrical and said valve bore extends axially of said container from the upper surface of said connector body including:

a solenoid including a plunger mounted on said valve body and adapted to actuate said movable valve element, a bleed passage extending from said valve chamber to said second annular passage, and a pair of electrical terminals for extending from said solenoid and adapted to be connected with a control circuit.

3. For use in an automotive air conditioning system, a connector body, a receiver/dehydrator container having an upper end surmounted by said connector body, said connector body and at least the upper end of said container being of unitary construction, said container having a closed lower end defining a receiver chamber, said connector body having a first annular passage therein in fluid communication with said receiver chamber, a draw tube extending between said connector body and the lower portion of said container, a dehydrator disposed in the upper portion of said receiver chamber between said first annular passage and the lower end of said draw tube, a valve bore extending axially into said connector body from the upper end thereof, a solenoid valve disposed in said valve bore and having a valve body at its lower end and a solenoid at its upper end, a valve chamber in said valve body in fluid communication with the upper end of said draw tube, a second annular passage surrounding said valve body, a valve outlet port in said valve body in fluid communication with said second annular passage, a valve orifice in said valve body in fluid communication with said valve chamber and said valve outlet port, a movable valve element adapted to open and close said orifice, a first laterally extending passage in said connector body extending from said first annular passage to the peripheral surface of said connector body, and a second laterally extending passage in said connector body extending from said second annular passage to the peripheral surface of said connector body.

4. The invention as defined in claim 3 wherein said connector body is unitary with at least the upper portion of said container.

* * * * *